Figure 1:
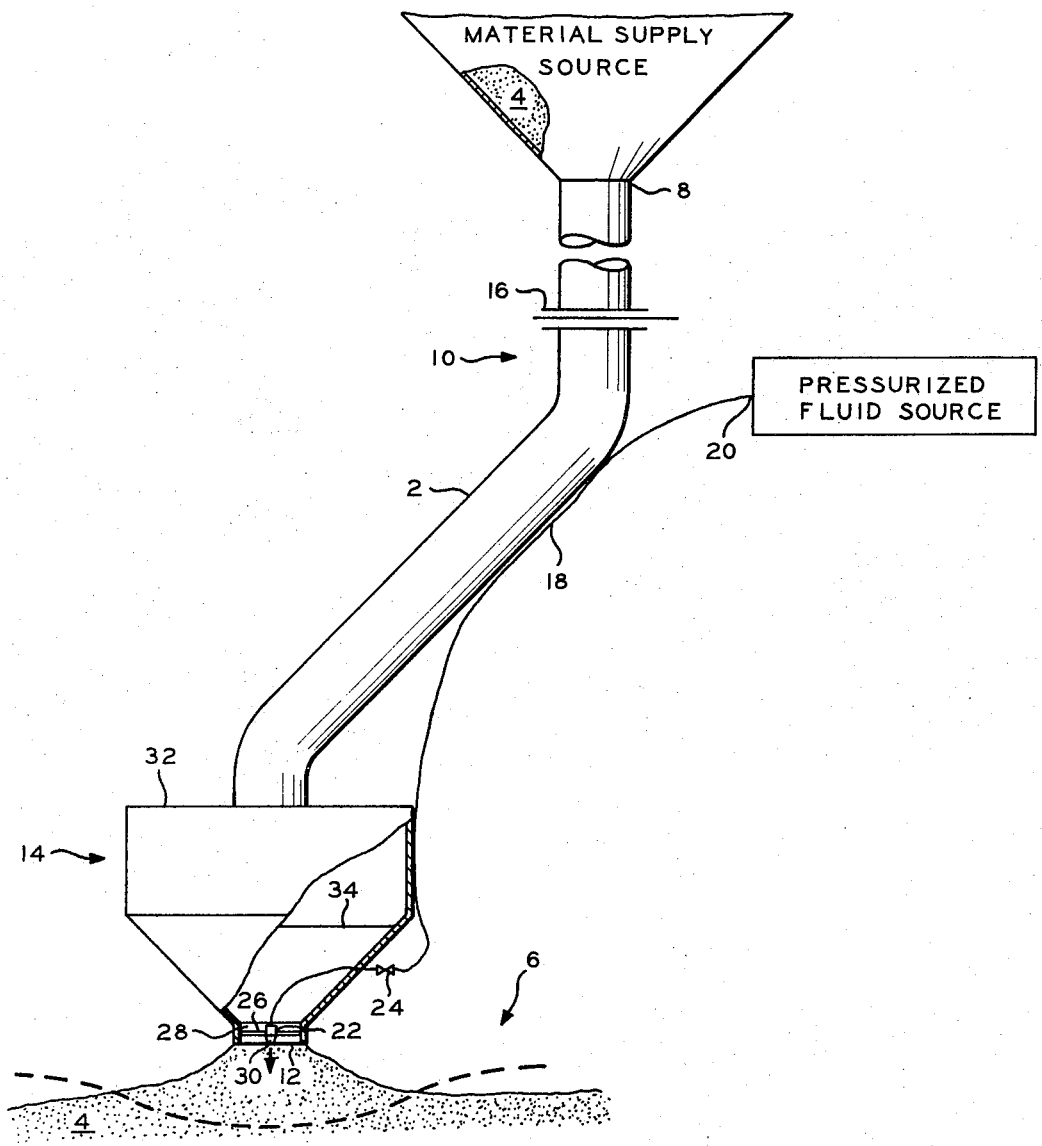

United States Patent
Parrish

[15] 3,677,311
[45] July 18, 1972

[54] MATERIAL MOVING APPARATUS AND METHOD

[72] Inventor: Russell C. Parrish, Bartlesville, Okla.
[73] Assignee: Phillips Petroleum Company
[22] Filed: Feb. 8, 1971
[21] Appl. No.: 113,305

[52] U.S. Cl...................................141/1, 141/67, 141/90, 141/285, 222/457
[51] Int. Cl. .......................................B65b 1/04, B65b 3/04
[58] Field of Search ...............214/10.5, 17; 222/1, 194, 195, 222/457; 141/40–43, 62, 90, 91, 115, 250, 192, 106, 285, 310, 364, 365, 324, 1, 2, 11, 67, 68

[56] References Cited
UNITED STATES PATENTS 3,219,072  11/1965  Lau..........................................141/90

Primary Examiner—Houston S. Bell, Jr.
Attorney—Young and Quigg

[57] ABSTRACT

A first end of a delivery conduit is in communication with a supply source which extends generally downwardly therefrom and has a second end positioned above a second location. A pressurized fluid conduit is positioned within a discharge end of the delivery conduit with said pressurized fluid conduit being directed outwardly therefrom. Means are provided for intermittently discharging pressurized fluid from the pressurized fluid conduit and the delivery conduit for moving material through and from the delivery conduit.

10 Claims, 2 Drawing Figures

PATENTED JUL 18 1972　　　　　　　　　　　3,677,311

INVENTOR.
R. C. PARRISH

BY Young & Quigg

ATTORNEYS

MATERIAL MOVING APPARATUS AND METHOD

In the movement of material, particularly granular or powdered material, from a source location to a second location, the delivery conduit often is difficult to empty at the termination of the supply of material to said conduit. This is particularly true where the flow of material through the delivery conduit is totally dependent upon gravity and the second location is a receptacle being filled. In this situation, the material within the receptacle mounds up about the discharge end of the delivery conduit before the container can be completely filled and functions to stop the gravity flow of the material from the conduit. In general operations, the operator positions the discharge end of the delivery conduit near the top of the container being filled so that when material flow through the delivery conduit terminates as a result of the mounding of the material at the second location, the container is substantially full. The operator then terminates the flow of material from the material supply source into the delivery conduit and moves the discharge end of the delivery conduit and/or an unfilled receptacle to initiate a new filling cycle. Often during this movement for the initiation of a new filling cycle, the material contained within the delivery conduit discharges therefrom causing loss of material, time, and labor.

In order to alleviate these spillage problems, some forms of impart devices have been installed on the delivery conduit, but these devices are often relatively expensive and are sometimes difficult to maintain in an operating condition owing to the dust that is generally associated with an operation of this type.

This invention therefore resides in an apparatus for intermittently discharging a volume of pressurized fluid outwardly from within the discharge end of the delivery conduit for moving the mounded material in directions away from said discharge end and for forming an area of low pressure adjacent the discharge end of the delivery conduit for the moving of material from the delivery conduit to a second location spaced therefrom.

Other aspects, objects, and advantages of the present invention will become apparent from a study of the disclosure, the appended claims, and the drawing.

The drawings are diagrammatic views of the apparatus of this invention.

Figure 2:
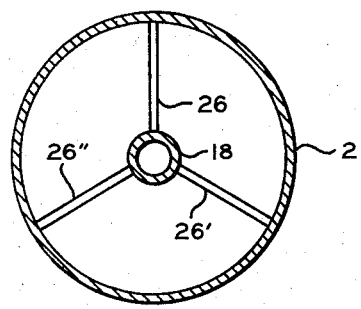

FIG. 1 shows the delivery conduit and associated equipment of this invention, and FIG. 2 shows a partial cross-sectional view of the second end portion of the delivery conduit with the pressurized fluid conduit positioned therein.

Referring to FIG. 1, a material supply source is provided which has contained therein material of a fine, granular, and/or powdered form such as, for example, carbon black. A delivery conduit 2 is in communication with the material 4 within the material supply source and extends generally downwardly therefrom for the flow of material 4 from the material supply source to a second location 6 spaced at a lower elevation and adjacent the delivery conduit 2. The delivery conduit 2 has a first end 8 associated with the material supply source, a first end portion 10, and a second end 12 and second end portion 14 that are positioned at a lower elevation than the first end 8 thereof and at a higher elevation than the second location 6.

A material flow control means such as a valve 16, for example, is connected to and/or associated with the first end 8 of the delivery conduit or positioned within the first end portion 10 of said conduit for interrupting the flow of material 4 from the material supply source into the delivery conduit 2.

A pressurized fluid supply source, such as an air compressor, for example, is in communication with a first end 20 of a pressurized fluid conduit 18 for passing pressurized fluid through and from the pressurized fluid conduit 18. The second or discharge end 22 of the pressurized fluid conduit 18 is positioned within the second end portion 14 of the delivery conduit 2 adjacent the second end 12 thereof and is directed outwardly from second end 12 of the conduit 2.

A valve 24 or other means known in the art is associated with the pressurized fluid conduit 18 or the pressurized fluid source for intermittently passing fluid through and from the pressurized fluid conduit 18 and outwardly from the second end 12 of the delivery conduit 2. An actuation switch can be provided with a compressor, for example, for intermittently passing a volume of pressurized fluid through and from the pressurized fluid conduit 18, but for ease in construction and maintenance it is preferred that a manually operated valve be installed within the pressurized fluid conduit 18 for regulating the flow of fluid therethrough.

It is preferred that the second end 22 of the pressurized fluid conduit 18 be substantially axially aligned within the delivery conduit 2 in order that the forces of the fluid discharging therefrom more effectively move material 4 from beneath the delivery conduit 2 and generate an area of lower pressure about the circumference of said second end 22 whose boundary is substantially equidistant from the walls of the delivery conduit 2. In order that the second end 22 of the pressurized fluid conduit 18 is maintained in the preferred aligned position relative to the discharge end 12 of the delivery conduit 2, it is preferred that at least one bracing member 26, preferably a plurality of bracing members 26,26′,26″ be attached to the pressurized fluid conduit 18 and the second end portion 14 of the delivery conduit 2.

In order to provide sufficient force to move the material 4 beneath the conduit 2 outwardly, it is preferred that the pressurized fluid source and the size of the pressurized fluid conduit 18 be sufficient for discharging at least 60 cubic feet per minute of pressurized fluid from the second end 22 of the pressurized fluid conduit 18. It is also desirable that the cross-sectional area of the pressurized fluid conduit 18 be sufficiently small so as not to unduly restrict the free flow of material through the chamber 28 of the delivery conduit 2.

It has been found that with a ratio of the cross-sectional area of the chamber 28 of the delivery conduit 2 to the cross-sectional area of the pressurized fluid conduit 18 of at least greater than about 50 to 1, sufficient free flow area is provided so as to prevent undesirable restriction of the delivery conduit 2. At ratios lower than about 50 to 1, there will generally be an excessive expenditure of time and labor during filling operations.

A nozzle 30 can also be attached to the second end 22 of the pressurized fluid conduit 18 for regulating the stream of fluid discharging therefrom and regulating and matching the size of the stream to the characteristics of the material being moved. This nozzle can also be constructed to regulate the area of low pressure generated adjacent thereto during the flow of fluid therefrom.

Other construction of the apparatus of this invention can be employed such as providing a delivery conduit 2, the second end portion 14 of which is comprised of a hopper 32 and a filtering screen 34, for example, such as can be effectively utilized during the movement of carbon black, for example.

In the operation of the apparatus of this invention, material 4 is delivered from the material source into the first end portion 10 of the delivery conduit 2. The material then gravitationally flows through the chamber 28 of the delivery conduit 2 and to a second location 6 positioned therefrom. That second location 6 can be, for example, a railway hopper car or other containers. As the material 4 continues to discharge, a condition will occur, as shown in FIG. 1, at which material at the second location 6 has an elevation equal to or higher than the second end 12 of the delivery conduit 2. At this condition, the gravity flow of material 4 from the conduit 2 will terminate. Also at this condition, the second location 6 or hopper car is generally substantially filled.

The valve 16 is closed, for example, to terminate the delivery of material 4 into the delivery conduit 2. A volume or a plurality of volumes of pressurized fluid is then discharged from the pressurized fluid conduit 18. The pressurized fluid discharging therefrom moves the material at the second location 6 outwardly from a position adjacent the second end 12 of the delivery conduit 2 thereby forming a cavity, a shown by broken line in FIG. 1, in the material for receiving material positioned in the delivery conduit 2. The fluid discharging from the second end 22 of the pressurized fluid conduit 18 or the nozzle 30 connected thereto also generates an area of low pressure adjacent thereto which adds to the gravity forces exerted on the material to move said material from the delivery conduit 2. The configuration of the stream discharging from the pressurized fluid conduit 18 can also be varied by the utilization of different sized and constructed nozzles in order to provide a force adequate to effectively move the particular type of material that is being handled.

Other modifications and alterations of this invention will become apparent to those skilled in the art from the foregoing discussion and accompanying drawing, and it should be understood that this invention is not to be unduly limited thereto.

What is claimed is:

1. An apparatus for moving material from a material supply source to a second location, comprising:
   a delivery conduit having first and second ends and first and second end portions, being in communication at the first end with a material supply source, and extending generally downwardly therefrom with the second end at a position above the second location for the flow of material from the material supply source to the second location;
   a pressurized fluid supply source;
   a pressurized fluid conduit having first and second ends, said first end being in communication with the pressurized fluid supply source and said second end being positioned within the second end portion of the delivery conduit adjacent the second end thereof and directed outwardly relative thereto;
   means for interrupting the flow of fluid from the supply source into the delivery conduit; and
   means for intermittently passing pressurized fluid through and from the pressurized fluid conduit and outwardly from the second end of the delivery conduit for moving material outwardly from the second end of the delivery conduit and from within said delivery conduit.

2. An apparatus, as set forth in claim 1, wherein the second end of the pressurized fluid conduit is substantially axially aligned within the delivery conduit.

3. An apparatus, as set forth in claim 1, including at least one bracing member attached to the pressurized fluid conduit and the second end portion of the delivery conduit for maintaining the second end of the pressurized fluid conduit directed outwardly from the second end of the delivery conduit.

4. An apparatus, as set forth in claim 1, wherein the pressurized fluid source and the pressurized fluid conduit are of a size sufficient to discharge at least 60 cubic feet per minute of pressurized fluid from the second end of the pressurized fluid conduit.

5. An apparatus, as set forth in claim 1, wherein the ratio of the cross-sectional area of the chamber of the delivery conduit relative to the cross-sectional area of the pressurized fluid conduit is at least greater than about 50 to 1.

6. An apparatus, as set forth in claim 1, wherein the second end portion of the delivery conduit comprises a hopper having a filtering screen.

7. A method for moving material from a material supply source, through a conduit, and to a second location, comprising:
   discharging material into a delivery conduit;
   passing the material by gravity through and from the delivery conduit to a second location spaced from the material supply source;
   continuing to pass said material from the delivery conduit until said material is prevented from discharging from the delivery conduit by the material positioned at the second location;
   terminating delivery of the material into the delivery conduit;
   discharging a volume of pressurized fluid from a conduit positioned within and adjacent the discharge end of the delivery conduit for moving the material at the second location outwardly from the discharge conduit and causing the material within the discharge conduit to flow therefrom.

8. A method, as set forth in claim 7, wherein the volume of fluid discharges at a rate of at least 60 cubic feet per minute.

9. A method, as set forth in claim 7, wherein the volume of air is directed outwardly from the discharge conduit along a pathway that is substantially coaxially oriented relative to said discharge conduit.

10. A method, as set forth in claim 9, wherein the pressurized fluid is air.

* * * * *